3,365,506
ADDITION OF ETHYLENE TO TERTIARY ALKYL HALIDES
Emmett H. Burk, Jr., Glenwood, and Endre Horvath, Chicago, Ill., assignors to Sinclair Research, Inc., Wilmington, Del., a corporation of Delaware
No Drawing. Filed Mar. 18, 1964, Ser. No. 352,941
8 Claims. (Cl. 260—658)

This invention is directed to a method for the production of branched chain hydrocarbon halides by the addition of ethylene and a tertiary alkyl halide in the presence of an isoparaffin.

The production of branched chain hydrocarbon halides by the addition reaction of lower molecular weight tertiary alkyl halides or secondary alkyl halides and ethylene in the presence of a strong Friedel-Crafts catalyst such as $AlCl_3$ is a known process. Although there have appeared a few isolated reports of conversion in selective yields obtained by the reaction, the reaction in general has presented a problem to skilled technicians in the art. A major problem has been the inability to obtain substantial selective yields of the final product with satisfactory conversion of the starting alkyl halide reactant. In many cases, undesirable hydrocarbon chlorides are formed. For example, in the addition of ethylene to t-butyl chloride the desired product is 3,3-dimethyl-1-chlorobutane. It may be possible to recycle other chlorides containing less than six carbon atoms to the reaction zone. However, the formation of 3,3-dimethyl-1-chloropentane and $C_8$ chlorides also occurs to a considerable extent. These chlorinated hydrocarbons are undesirable by-products and methods for preventing their formation are sought.

It has now been found that the amount of undesirable by-products can be reduced by carrying out the reaction in the presence of an isoparaffin, i.e. a paraffin hydrocarbon having a tertiary C atom to which a hydrogen atom is attached. Preferably the isoparaffin has only one such tertiary carbon atom. The result is surprising because straight chain paraffins do not have this effect. Suitable isoparaffins are those containing from about 4 to about 16 or more carbon atoms and preferably 4 to 6 carbon atoms. For example, isobutane, isopentane, isohexane, isooctane, isododecane, isohexadecane, isooctadecane and phenyl-substituted paraffins may be used. For a given product halide whose yield it is desired to increase, the isoparaffin has two less carbon atoms than said alkyl halide product. The preferred isoparaffin is one having the same carbon atom structure as the halide feed. When the isoparaffins of this invention are used in the addition reaction of ethylene to alkyl halides, there is noted a substantial decrease in the formation of those halides which cannot be converted to the desired alkyl halide product. Any amount of the isoparaffin can be used with beneficial results. However, the mole ratio of isoparaffin to alkyl halide should be from about 0.5:1 to about 10:1 for good results. The preferred range is from 1:1 to 5:1. We have found that in the case of the reaction of 2-chloropropane with ethylene to form, in situ, 2-methyl-2-chlorobutane, which in turn reacts with additional ethylene to form 1-chloro-3,3-dimethyl pentane, the use of isopentane in the reaction greatly reduced the amount of undesirable by-product hydrocarbon chlorides having 6 or more carbon atoms in the molecule.

It has further been found that in the addition of ethylene to t-butyl chloride in the presence of an aluminum chloride catalyst that the amount of undesired chlorides could be reduced from about 15% to less than about 1% by using isobutane in the reaction. In this case, isobutane is particularly desirable because not only does it reduce the amount of undesirable chlorides produced, but it also acts as an internal coolant. The boiling point of isobutane at atmospheric pressure is $-11.7°$ C. This property of the isobutane would provide the most favorable temperature and isothermal condition for the reaction. Isobutane as an internal coolant could eliminate an expensive temperature controlling system for the reactor.

A portion of the iso-paraffin used in the reaction is converted to other hydrocarbons. For example when isobutane is used about 30% of the isobutane is converted to isopentane, diisopropyl and isoheptane. These compounds are easily separable from the 1-chloro-3,3-dimethylbutane product and represent a valuable product by themselves since they have high octane numbers and may be used as fuel components. Thus the conversion of isobutane does not present any economic disadvantage in this process.

The alkyl halide feed used in the addition reaction may contain from about 3 to about 16 carbon atoms and preferably they contain 3 to 6 carbon atoms. Examples of suitable halides are tertiary butyl halide, tertiary amyl halide, tertiary hexyl halide and tertiary decyl halide. The halide substituent of the reactant is a halogen of 17 to 53 atomic number, i.e. chloride, bromide and iodine. The preferred halide is the chloride and the preferred alkyl halide is tertiary butyl chloride. The alkyl halide feed may be formed in situ by adding ethylene to a lower halide as in Example 2.

Ethylene may be added to the reaction in any convenient manner. For example, ethylene may be added to the iso-paraffin at the same time as the alkyl halide and strong Friedel-Crafts catalysts are added. A preferred method is to add large amounts of the ethylene initially. The presence of large amounts of ethylene at the time that substantial ethylene consumption begins results in a particularly active $AlCl_3$ catalyst. Absence of sufficient amounts of ethylene at this stage apparently results in an inefficient catalyst as manifested by relatively poor selective yields and conversions obtained. Once the active catalyst is formed, however, the presence of large amounts of ethylene no longer need be maintained. Thus in continuous operations for instance, once the active catalyst has been formed, stoichiometric quantities of ethylene to tertiary alkyl halide can be employed and the desired results obtained. Most advantageously, however, the alkyl halide is first saturated with ethylene prior to addition of the $AlCl_3$ and a sustained operation attained by maintaining the presence of at least 15 moles of ethylene per mole of $AlCl_3$ throughout the reaction. A particularly suitable ethylene addition rate for example, is about 25 to 45 moles of ethylene per mole of $AlCl_3$ per hour.

The catalysts employed in our process comprise strong Friedel-Crafts catalysts such as anhydrous $AlCl_3$, $AlBr_3$, $HF \cdot BF_3$ and $BF_3 \cdot H_2O$. The strong Friedel-Crafts catalyst employed in the addition reaction is present in amounts sufficient to catalyze the reaction, the amount generally falling in the range of about 0.1 to 5, preferably 0.5 to 3, percent by weight based on the alkyl halide charge. A drop in the reaction temperature or a slowing in the reaction rate can be corrected by the increment addition of the Friedel-Crafts catalyst, usually no more than 0.1 to 1 percent by weight based on the alkyl halide reactant per addition is required. The reaction can be effected either as a batch or continuous operation. The reaction temperature is not critical, however, temperatures in the range of about $-25$ to $0°$ C. for batch operation and $-25$ to $50°$ C. for continuous operation are preferred. Atmospheric pressure is suitable for the reaction, but subatmospheric or superatmospheric pressures can be used if desired. After the reaction has gone essentially to completion the resulting branched chain alkyl halide product can be separated from the residual catalyst oil as by washing with water, alcohol, dilute aqueous caustic or other suitable washing method. The catalyst oil separated can be stored for use in the next batch reaction.

The following examples are included to further illustrate the improved process of the present invention.

EXAMPLE I

Isobutane was fed into a one liter three-neck flask, equipped with baffles and cooled while stirring to —15° C., from a 500 cc. gas bomb. The weight of the isobutane feed was measured by measuring the weight of the bomb during the feeding. After charging isobutane to the reactor the aluminum chloride catalyst and the t-butylchloride were added into the reactor. Ethylene was cut in at the same moment (ethylene was introduced under a stirrer at the bottom of the reactor). The reaction temperature was maintained by the evaporation of isobutane which was condensed in a finger-type cooler. The condenser was cooled with the mixture of Dry-Ice in isopropanol. The reaction was stopped after 90 minutes by killing the catalyst with methanol. Six moles of methanol were used per mole of aluminum chloride. The product mixture was stabilized at room temperature. A series of Dry-Ice traps was used to prevent loss of light components. The stabilized mixture was distilled and the fractions and liquids from the Dry-Ice traps were analyzed by vapor-phase chromatography. Conditions of the runs and conversion data are given in Table I.

EXAMPLE II

1 - chloro - 3,3 - dimethylpentane was formed by addition of ethylene to 2 - methyl - 2 - chlorobutane. The 2-methyl - 2 - chlorobutane was formed in situ from 2-chloropropane and ethylene.

2 - chloropropane and isopentane, both measured by weight, were poured into a one-liter three-neck flask, equipped with baffles, and cooled while stirring to —20° C. The aluminum chloride catalyst was added to the cooled mixture. Ethylene was cut in at the same moment and was fed continuously during the reaction. The temperature of the liquid was adjusted to —5° C. Dry-Ice in isopropanol was the means to control the temperature of the reaction. Other procedures were the same as in Example I.

Conditions of the runs and conversion data are given in Table II.

TABLE I

| Run Number | 1 | 2 | 3 | 4 |
|---|---|---|---|---|
| Reaction Temperature (°C.) | —12 | —12 | —12 | —12 |
| Reaction Time (min.) | 90 | 90 | 90 | 90 |
| Wt. Percent of AlCl₃ a | 2 | 2 | 2 | 5 |
| Mole Ratio of i-C₄ to t-BCl | 0 | 1:1 | 2:1 | 5:1 |
| Mole Ratio of t-BCl to C₂H₄ | 1:1.2 | 1:1.2 | 1:1.2 | 1:2 |
| Reacted t-BCl, percent | 98 | 99 | 99 | 87 |
| Reacted i-C₄, percent | | 33 | 26 | (b) |
| Mole of C₂H₄ Consumed per mole of 1Cl-3,3-DMB formed | 1.3 | 1.2 | 1.4 | 1.4 |
| Mole Ratio of 1Cl-3,3-DMB to C₆+ chlorides c | 9:1 | 27:1 | 41:1 | ∞ | a Based on t-butylchloride.
b Undetermined.
c Other than 1Cl-3,3-DMB.

TABLE II

| Run Number | 5 | 6 | 7 |
|---|---|---|---|
| Reaction Temperature (°C.) | —5 | —5 | —5 |
| Reaction Time (min.) | 90 | 90 | 90 |
| Wt. Percent of AlCl₃ a | 4 | 4 | 4 |
| Mole Ratio of i-C₅ to 2Cl-Pr | 0 | 5:1 | 5:1 |
| Mole Ratio of 2Cl-Pr to C₂H₄ | 1:1.5 | 1:1 | 1:1.8 |
| Reacted 2Cl-Pr, percent | 62 | 86 | 97 |
| Reacted i-C₅, percent | | 41 | 25 |
| Mole of C₂H₄ consumed per mole of 1Cl-3,3-DMP formed | 4.4 | 2.0 | 2.2 |
| Mole Ratio of 1Cl-3,3-DMP to C₆+ chlorides b | 1.29:1 | 1.67:1 | 10:1 | a Based on 2Cl-propane.
b Other than 1Cl-3,3-DMP.

We claim:

1. In the process for the production of branched chain hydrocarbon halides by the addition of ethylene to a tertiary alkyl halide containing from about 4 to about 16 carbon atoms per molecule in the presence of a Friedel-Crafts catalyst at a temperature of about —25° C. to 50° C., the improvement which comprises carrying out the process in the presence of about 0.5–10 moles of an isoparaffin per mole of said tertiary alkyl halide, said isoparaffin containing from 4 to about 16 carbon atoms per molecule and 2 less carbon atoms than said hydrocarbon halide product.

2. The process of claim 1 in which the tertiary alkyl halide is t-butyl chloride and the isoparaffin is isobutane.

3. The process of claim 1 in which the tertiary alkyl halide is 2 - methyl - 2 - chlorobutane and the isoparaffin is isopentane.

4. The process of claim 1 wherein ethylene is added at the rate of at least 50 moles per hour of ethylene per mole of catalyst.

5. The process of claim 1 in which the Friedel-Crafts catalyst is AlCl₃.

6. The process of claim 1 wherein the ratio of isoparaffin to tertiary alkyl halide is 1 to 5:1.

7. The process of claim 1 wherein the isoparaffin has the same carbon atom structure as said alkyl halide feed.

8. The process of claim 3 wherein 2 - methyl - 2-chlorobutane is formed in situ by the addition of ethylene to 2-chloropropane.

References Cited

UNITED STATES PATENTS 2,413,384 12/1946 Schmerling _____ 260—658
2,419,500 4/1947 Peterson et al. _____ 260—658
2,533,052 12/1950 Schmerling _____ 260—658

LEON ZITVER, Primary Examiner.

DANIEL D. HORWITZ, Examiner.

K. V. ROCKEY, T. G. DILLAHUNTY,
Assistant Examiners.